(No Model.)
G. GRAY.
NOSE BAG.
No. 345,839. Patented July 20, 1886.
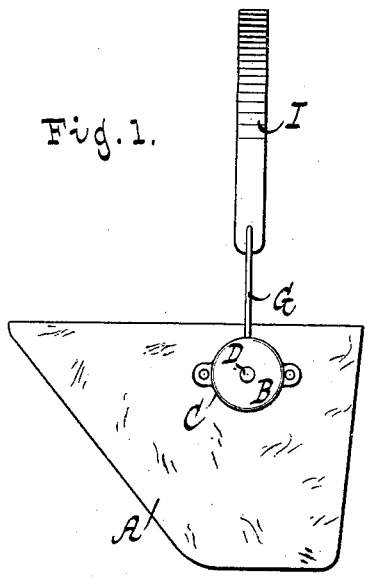
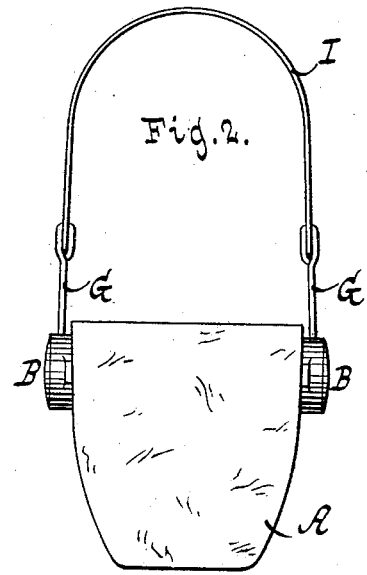
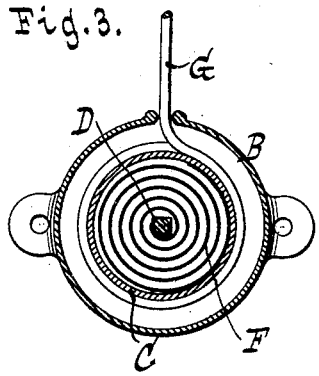
WITNESSES:
John W. Ripley
Charles A. Gregory
INVENTOR
George Gray
BY S. S. Gordon
ATTORNEY

UNITED STATES PATENT OFFICE.

GEORGE GRAY, OF NEW YORK, N. Y.

NOSE-BAG.

SPECIFICATION forming part of Letters Patent No. 345,839, dated July 20, 1886.

Application filed November 12, 1885. Serial No. 182,621. (No model.)

*To all whom it may concern:*

Be it known that I, GEORGE GRAY, of the city, county, and State of New York, a subject of the Queen of Great Britain, have invented a new and useful Improvement in Nose-Bags, which is fully set forth in the following specification and accompanying drawings, in which—

Figure 1 is a side view of my improved nose-bag; Fig. 2, an end view thereof. Fig. 3 represents parts in detail.

The object of my invention is to provide means for a more convenient and reliable application of self-adjusting nose-bags to the mouths of animals than those heretofore in use, by which the contents are kept in the proper position to be readily partaken of until the whole is consumed; and it consists in the peculiar construction and arrangement of the several devices for combined action hereinafter specified.

In the drawings, A is the feed-bag; B B, the casings; C C, the spring-reels; D, the axial pivot; F F, the springs; G G, the cords; I, the strap.

The operation of these parts is as follows: The feed is placed in bag A. Cords G G are unwound from reel C C, so that head-strap I may be placed upon the head of the animal, leaving nose-bag A suspended by springs F F, the tension of which balance the weight and impel the bag upward as it is lightened by the consumption of its contents, thus automatically preserving convenient accessibility to the unconsumed feed and restraining the animal from tossing its head to get the feed, thereby spilling and wasting it.

The advantages of my improved adaptation of springs to feed-bags over the methods of former users of springs are these: The apparatus will not readily get out of order, and not only are the reels a novelty, but they are so made fixtures of the bag itself as to preserve them from liability to injury by blows and rough usage, whether in use or not, and their efficiency is promoted by the exclusion of dirt or portions of the oats or other feed, which would obstruct the action of the springs and cords, if admitted. The cords can obviously constitute the head-strap, if desired.

What I claim as my invention, and desire to secure by Letters Patent, is—

The combination of nose-bag A, casings B B at the sides thereof, revolving spring-reels C C, mounted therein, cords G G, adapted to wind on and off the reels, and a head-strap, constructed and operating together substantially as and for the purpose described.

GEORGE GRAY.

Witnesses:
JOHN W. RIPLEY,
OSCAR MATHER.